T. L. DE BEJAR & B. LANZAGORTA.
PNEUMATIC SPRING FOR VEHICLES.
APPLICATION FILED JAN. 30, 1912.
1,073,840.
Patented Sept. 23, 1913.
2 SHEETS—SHEET 2.
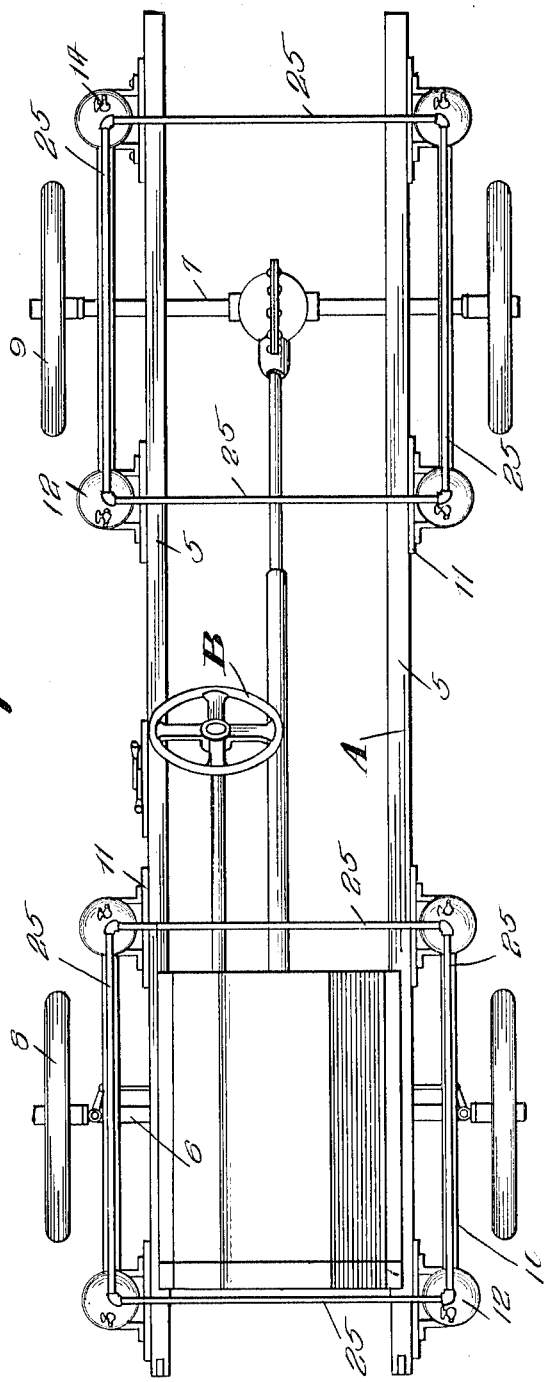
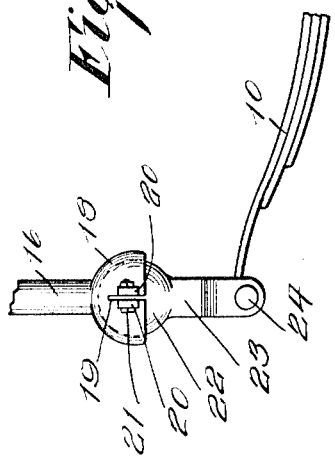
Witnesses
Inventors
T. L. de Bejar
B. Lanzagorta
By Chandlee & Chandlee
Attorney

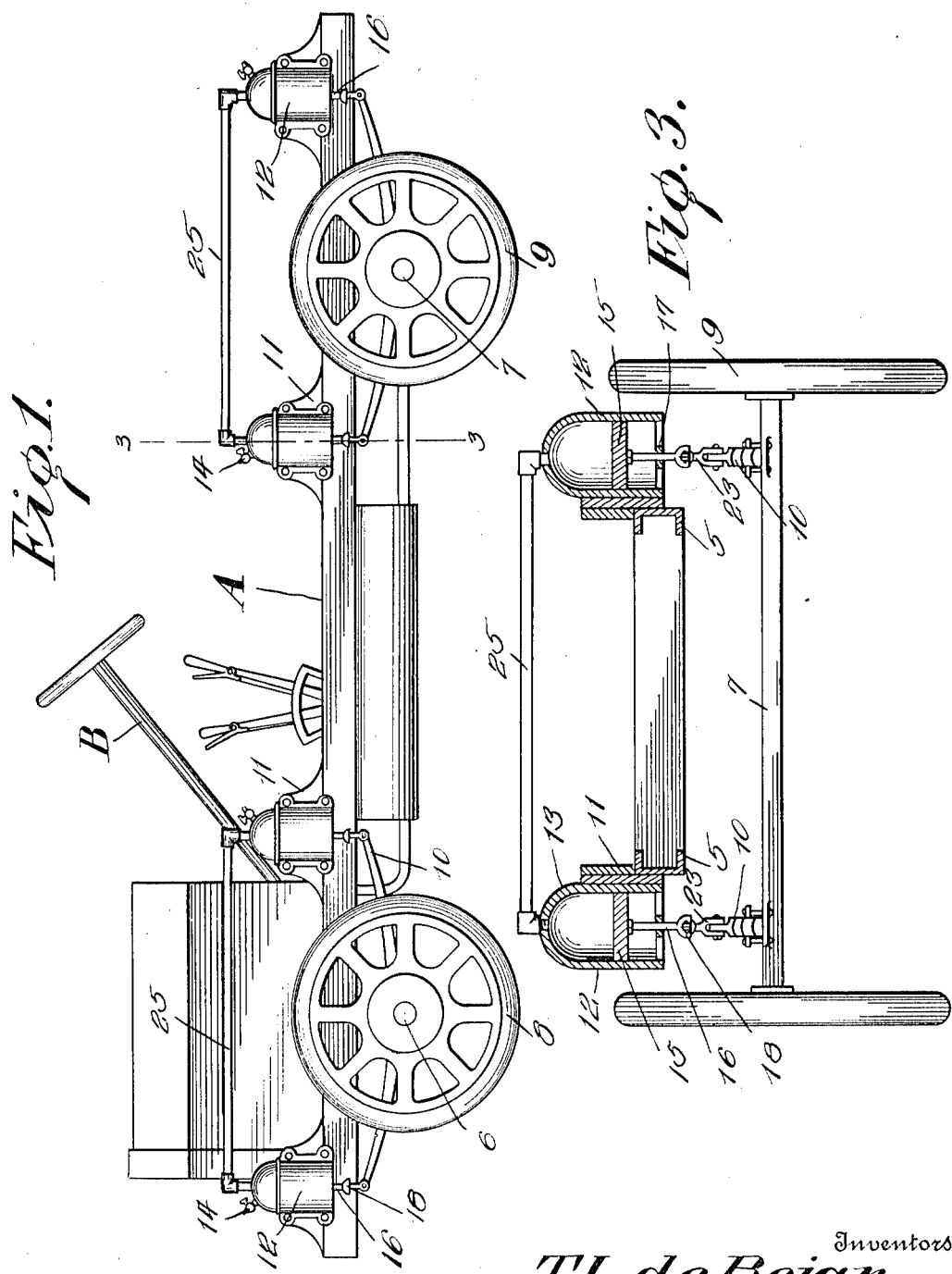

UNITED STATES PATENT OFFICE.

TOMÁS LUIS DE BEJAR AND BERNARDO LANZAGORTA, OF HABANA, CUBA.

PNEUMATIC SPRING FOR VEHICLES.

1,073,840. Specification of Letters Patent. Patented Sept. 23, 1913.

Application filed January 30, 1912. Serial No. 674,345.

*To all whom it may concern:*

Be it known that we, TOMÁS LUIS DE BEJAR and BERNARDO LANZAGORTA, subjects of the King of Spain, residing at the city of Habana, Cuba, have invented new and useful Improvements in Pneumatic Springs for Vehicles, of which the following is a specification.

This invention relates to an improvement in pneumatic springs for vehicles.

The principal object of the invention is to provide a means of novel construction for absorbing all shocks and jars incident to the vehicle passing over uneven surfaces.

Another object of the invention is to provide a pneumatic means between the body and the springs for permitting not only lateral movements of the axles but also permitting of the supporting springs to be shifted longitudinally when influenced by the weight of the body.

A further object of the invention is to provide a device for the purpose described which is composed of a minimum number of parts, is therefore simple in construction, and is cheap to manufacture.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction within the scope of the claim, may be resorted to without departing from the spirit or sacrificing any of the advantages of the invention.

In the drawings: Figure 1 is a side view of a motor vehicle equipped with our improved cushioning means, Fig. 2 is a top plan view thereof, Fig. 3 is a transverse sectional view taken on the line 3—3 of Fig. 1, and Fig. 4 is a detail view showing the connection between a piston rod and a spring.

Like reference numerals designate corresponding parts in all the figures of the drawings.

Referring to the drawings, the invention comprises a body A, and this body includes the usual side sills 5—5. Front and rear axles 6 and 7 respectively are disposed below the frame, and front and rear wheels 8 and 9 are respectively mounted on said axles, the front wheels being turned by the steering mechanism which is indicated as a whole by the reference letter B. Inasmuch as this mechanism does not constitute any part of our invention, it is deemed unnecessary to specifically describe the same. Mounted upon each of the axles 6 and 7 and at the ends thereof are leaf-springs 10 for supporting the body A, said springs being longitudinally disposed and arranged beyond the side sills 5 of said body.

Secured to each end of each side sill 5 and respectively disposed equi-distant from the respective axles 6 and 7 and above the ends of the springs is a pair of brackets 11. Secured to each bracket 11 and disposed directly above the respective end of a respective spring is a vertically disposed open ended cylinder 12 having a closure 13 associated with the upper end thereof. An air inlet valve 14 is associated with each closure 13, and is adapted for connection with an air compressor (not shown). Slidably mounted within each cylinder 12 is a piston 15, and extending downwardly therefrom is a piston rod 16, said rod passing through a suitable guide 17 which is carried by the lower end of the cylinder. The lower end of the rod 16 is enlarged to form a split socket element 18. One side of this element is split longitudinally, as at 19, and opposed ears 20—20 respectively project from the element and are adapted to be drawn together by means of a bolt 21 or any suitable means. Freely movable within the element 18 is a ball 22 of a link 23, the lower end of the link being bifurcated to receive the respective end of a respective spring 10, said end being connected by a pivot bolt 24, as will be readily understood. It will thus be observed that for each axle there is provided two springs and four cylinders, said cylinders being arranged in pairs and each pair carried by the body and having connection with the axle by means of the pistons and springs. In order to yieldably support the body upon the axles, all four cylinders of each set are respectively connected by a series of pipes 25, said pipes preferably being connected with the closures 13.

In practice, oil is preferably disposed within the cylinders 12 and upon the pistons 15, and compressed air is admitted into said cylinders through any of the valves 14, the air in the various cylinders communicating by means of the pipes 25. In practice, when the vehicle passes over stones or other obstructions either or both of the axles 6 and 7 may be projected at an angle with respect to the body. This movement of either or both axles will force the air from the cylinders on one side of the vehicle through the pipes 25 to the cylinders on the other side of the vehicle, thereby equalizing the pressure within said cylinders.

What is claimed is:

In a vehicle, the combination with the bed frame, of an axle disposed thereunder, a pair of compressed air cylinders secured to each side of the frame and disposed equi-distant from a respective axle, leaf springs each centrally secured to the axle, pistons movable in said cylinders, a guide carried by the lower end of each cylinder, a piston rod extending downwardly from the piston through the guide and terminating at its lower end in a split socket element, links each pivotally connected at one end to a respective end of a spring, a ball formed on the other end of each link and engageable within a respective socket element, and means for clamping said element around the ball.

In testimony whereof we have signed our names to this specification in the presence of two subscribing witnesses.

TOMÁS LUIS DE BEJAR.
BERNARDO LANZAGORTA.

Witnesses:
José Balbré,
C. Stewart O'Neill.